United States Patent [19]

Stenzenberger

[11] 4,303,779

[45] Dec. 1, 1981

[54] THERMOSETTING IMIDE RESINS FROM DIHYDRAZIDE

[75] Inventor: Horst Stenzenberger, Schriesheim, Fed. Rep. of Germany

[73] Assignee: Technochemie GmbH-Verfahrenstechnik, Dossenheim, Fed. Rep. of Germany

[21] Appl. No.: 97,657

[22] Filed: Nov. 27, 1979

[51] Int. Cl.$^3$ .............................................. C08G 73/12
[52] U.S. Cl. .................. 528/312; 428/473.5; 525/422; 528/170; 528/210; 528/211; 528/321; 528/322
[58] Field of Search ............... 528/322, 170, 312, 315, 528/321, 210, 211; 525/422

[56] References Cited

U.S. PATENT DOCUMENTS 3,562,223  2/1971  Bargain et al. ...................... 528/322
4,211,860  7/1980  Stenzenberger ..................... 528/322

Primary Examiner—Harold D. Anderson
Attorney, Agent, or Firm—Schwartz, Jeffery, Schwaab, Mack, Blumenthal & Koch

[57] ABSTRACT

Novel imide resins are prepared by reacting a mixture of a bisimide of an unsaturated dicarboxylic acid and a monoimide with a dihydrazide of a dicarboxylic acid, preferably in an organic solvent or diluent at elevated temperature for a period of time insufficient to yield an insoluble, infusible, fully cured imide resin. Solutions of the resulting prepolymerization product are stable at room temperature and their viscosity remains substantially unchanged for a prolonged period of time. Fully cured imide resins and articles thereof of a high heat resistance are obtained by heating said prepolymerized imide resin or materials such as fibers, metal wire webs, and others impregnated therewith, if desired, in the presence of curing catalysts, inhibitors, fillers and other materials to curing temperature up to 350° C.

17 Claims, No Drawings

THERMOSETTING IMIDE RESINS FROM DIHYDRAZIDE

BACKGROUND OF THE INVENTION

1. Field of the Invention

The present invention relates to novel and highly advantageous thermosetting imide resins, to a process of producing such imide resins, to compositions and methods of using same and to articles made therewith.

2. State of the Prior Art

It is known that the ethylenic double bond of maleic acid imides is readily reacted with basic organic compounds and especially, with organic amines whereby aspartic acid imides are formed. This mode of reaction has been used, for instance, for producing polymerizable imide resins. U.S. Pat. No. 3,562,223 describes said reaction and the reaction products. According to said patent, the speed of reaction is determined to a far reaching extent by the basicity of the amino compound.

It is also known that the ethylenically unsaturated double bond of bis-maleimides can be reacted with dicarboxylic acid hydrazide to form a thermosetting imide resin. West German Pat. No. P 27 54 631.2 teaches such a reaction wherein the polyimide can be polymerized upon heating to a highly crosslinked polyimide having high temperature stability.

SUMMARY OF THE INVENTION

It is one object of the present invention to provide novel and highly advantageous thermosetting imide resins having improved flow properties.

Another object of the present invention is to provide a simple and effective process of producing such thermosetting imide resins.

Still another object of the present invention is to provide a simple and effective method of polymerizing and hardening the prepolymerization products obtained according to the present invention.

A further object of the present invention is to provide articles such as molded articles or coated fiber materials, webs, filaments, rovings and the like.

Other objects of the present invention and advantageous features thereof will become apparent as the description proceeds.

The present invention relates to novel thermosetting imide resins obtained by the reaction of two components, component A, a mixture of N,N'-bisimide of an unsaturated dicarboxylic acid of a specific formula and a monoimide of a specific formula and component B, the dihydrazide of an organic dicarboxylic acid of a specific formula. The invention also relates to the process for producing the thermosetting imide resins.

It has, therefore, been discovered that new thermosetting imide resins with optimal flow properties can be obtained when monoimides of the general formula II

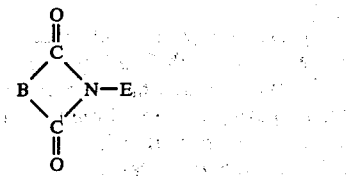

are mixed with the bisimides and this mixture is reacted with a dicarboxylic acid dihydrazide of the general formula III

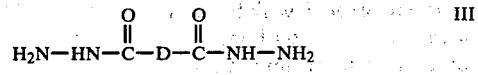

The reaction is carried out in such a manner that the molar ratio between the imide groups in the mixture and the hydrazide groups in the mixture, $$\frac{\text{Number of Moles of Unreacted Imide}}{\text{Number of Moles of Acid Hydrazide}}$$

are between 1.1 and 100. The fully unreacted monomer mixture contains no free hydrazide groups and polymerizes under heating conditions, for example, between 100° to 350° C. to a highly crosslinked polyimide resin having high thermal stability. Accordingly, the novel thermosetting imide resins of the present invention are obtained by reacting:

A. a mixture of an N,N'-bisimide of an unsaturated dicarboxylic acid of the general formula I

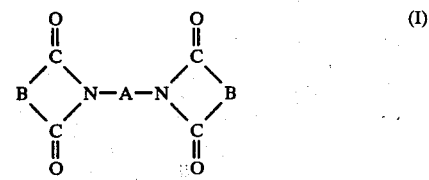

and a monoimide of the general formula II

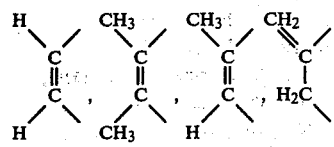

wherein A represents a divalent organic radical with at least two carbon atoms, E represents a monovalent radical with at least one carbon atom and B represents a divalent organic radical selected from the group consisting of the following radicals

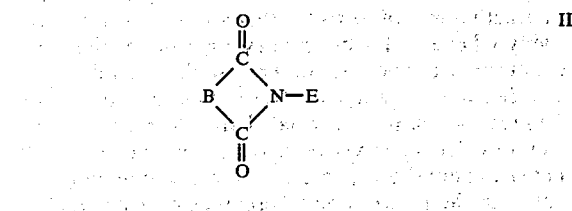

with

B. the dihydrazide of an organic dicarboxylic acid of the general formula III

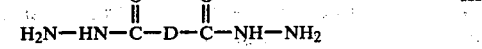

wherein D represents a divalent organic radical.

The group designated by A in Formula I can be an alkylene group with 2 to 12 carbon atoms, a cycloalkylene group with 5 or 6 carbon atoms, a heterocyclic group with 4 or 5 carbon atoms, and at least one nitrogen, oxygen, or sulfur atom in the heterocyclic ring,
a mono- or dicarbocylic group, or
at least two mono- or dicarbocylic aromatic or cycloalkylene groups which may be linked to each other by a carbon to carbon bond or
by a divalent group such as
oxygen,
sulfur,
alkylene with 1 to 3 carbon atoms, or one of the following groups:
—N=N—,

—NR$^1$—,

—P(O)R$^2$—,
—SO$_2$—,

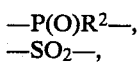

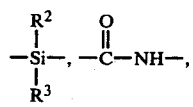

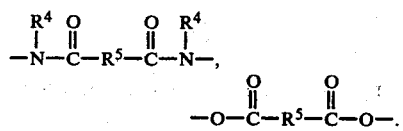

In said groups, the substituents R$^1$, R$^2$, R$^3$, R$^4$, and R$^5$, are alkyl with 1 to 5 carbon atoms.

Bisimides which have proven to be of special value for preparing the novel imide resins are:
1,2-bismaleimido ethane,
1,4-bismaleimido butane,
1,6-bismaleimido hexane,
1,12-bismaleimido dodecane,
1,6-bismaleimido-(2,2,4-trimethyl)hexane,
1,3-bismaleimido benzene,
1,4-bismaleimido benzene,
4,4'-bismaleimido diphenyl methane,
4,4'-bismaleimido diphenyl ether,
4,4'-bismaleimido diphenyl sulfide,
4,4'-bismaleimido diphenyl sulfone,
4,4-bismaleimido dicyclohexyl methane,
2,4-bismaleimido toluene,
2,6-bismaleimido toluene,
N,N'-m-xylylene bismaleimide,
N,N'-p-xylylene bismaleimide,
N,N'-m-phenylene biscitraconic acid imide,
N,N'-4,4'-diphenylmethane citraconimide,
N,N'-4,4'-diphenylmethane bisitaconimide,
and others. Mixtures of the above-mentioned bisimides can also be used for producing the imide resins according to the present invention.

In the general formula II, E can represent an alkyl group, a cycloalkyl group and an aryl group. Examples of monoimides include the following compounds:
N-methylmaleimide,
N-ethylmaleimide,
N-propylmaleimide,
N-dodecylmaleimide,
N-isobutylmaleimide,
N-isopropylmaleimide,
N-phenylmaleimide,
N-phenylcitroconimide,
N-phenylitaconimide,
N-toluylmaleimide,
N-mono-chlorophenylmaleimide,
N-biphenylmaleimide
N-napthylmaleimide
N-vinylmaleimide
N-allylmaleimide, and
N-cyclohexylmaleimide.

The divalent unsaturated group B of the general formula II is identical as that in general formula I.

In general formula III, D represents a divalent organic group such as an alkylene group, a cycloalkylene group and arylene group and the like.

Suitable dicarboxylic acid dihydrazides are, for instance, the following compounds:
oxalic acid dihydrazide,
malonic acid dihydrazide,
succinic acid dihydrazide,
glutaric acid dihydrazide,
adipic acid dihydrazide,
pimelic acid dihydrazide,
suberic acid dihydrazide,
sebacic acid dihydrazide,
cyclohexane dicarboxylic and dihydrazide,
terephthalic acid dihydrazide,
isophthalic acid dihydrazide,
2,6-naphthalene dicarboxylic acid dihydrazide,
2,7-naphthalene dicarboxylic acid dihydrazide,
and others. Mixtures of two or more of the above-mentioned dicarboxylic acid dihydrazides can also be used.

The production of new, thermosetting, imide resins having excellent flow characteristics is effected, for example, by intimately mixing the initial materials by using conventional methods of the mixing and grinding of powders and heating them subsequently to temperatures between 80° and 180° C. until a product that is still plastic or possibly still soluble, is formed. The progress of the prepolymerization has the effect that the initially low viscosity melt of the monomer mixture becomes steadily thicker and finally solidifies. Such a solidified or highly viscous melt may still be dissolved in high boiling solvents such as N-methylpyrrolidone, dimethylacetamide, dimethylformamide, tetramethylurea or their mixtures and used in the preparation of glass fabric preimpregnates (referred to hereinafter as prepregs).

The extent to which the prepolymerization is taken depends essentially on the intended application of the thermosetting polyimide prepolymer. For processing by means of injection molding, melt viscosities of 500-2500 centipoises are advantageous, while for processing with solvents, highly viscous resins are also suitable.

The new thermosetting imide resins may also be prepared in inert organic solvents, for example, dimethylformamide, dimethylacetamide, N-methylpyrrolidone, tetramethylurea of mixtures thereof. This is done preferably whenever further processing requires the use of a solution. Low boiling solvents, such as tetrahydrofuran, dioxane and ethyleneglycol ether may be used in the preparation. It is a special characteristic of the resin solutions that their viscosity over a period of months increases only slightly to a degree which does not interfere with the preparation of prepregs of glass fabric or carbon fibers, thus remaining practically constant. Prepregs prepared by means of such solutions stable with respect to viscosity are stable in storage at room temperature without deterioration of the properties necessary for the pressing to laminates, for example, the flow behavior of the resins.

The imide resins may also be prepared in inert diluents, wherein one or two of the three initial components are insoluble. This method of operation is preferably applied when the prepolymers having low melting points are desired, i.e. when prepolymerization is not to be taken too far.

In numerous industrial applications of the new imide resins, it is of advantage to accelerate hardening by the addition of catalysts. Effective hardening catalysts are, for example, organic peroxides, such as di-tert-butylperoxide, dicumylperoxide, t-butylperbenzoate in concentrations of 0.1–0.5% with respect to the total weight of the thermosetting imide resin. When catalysts are used, they are mixed during the preparation of the prepolymers with the initial compounds by one of the above-mentioned methods.

For other industrial applications of the new imide resins, it is advantageous to delay the hardening process, which is effected by means of a vinyl polymerization. In such cases, the imide resins are prepared in the presence of inhibitors of polymerization, for example, hydroquinone. The amount of the inhibitor to be used is approximately between 0.1 to 1.0%.

The imide resins are hardened by means of heating to temperatures between 100°–350° C., possibly under pressure, preferably at temperatures between 160°–260° C. Insoluble, unmeltable, crosslinked products with excellent high temperature properties are obtained.

A preferred field of application of the new imide resins are laminating materials. Processing is effected in a manner so that the imide resins are dissolved in high boiling solvents, such as N-methylpyrrolidone, dimethylacetamide or dimethylformamide and the solution used to coat glass fibers in the form of rovings or fabric or carbon fibers or boron fibers or synthetic organic fibers in the form of fabric, filaments or rovings, followed by the evaporation of the solvent and pressing the impregnated fibers into laminates, using pressure and heat.

The imide resins may also be processed by the known methods of the powder pressing process for thermosetting masses into shapes, wherein hardening takes place under pressure simultaneously with the molding process. For these applications, the usual additives such as fillers, pigments, plasticizers and flame retarders, may be added to the resins. Suitable fillers are, for example, glass fibers, carbon fibers, organic fibers with high moduli, such as aramides, quartz flour, kaolin, silicon dioxide and metals in the form of fine powders.

In embodiments of the invention on an industrial scale, the amounts given hereinbelow in the examples may be multiplied as needed and adapted to the industrial apparatus in existence or to be provided.

EXAMPLE 1

50 g (0.140 mole) 4,4′-bismaleimidodiphenylmethane, 50 g (0.289 mole) maleimidobenzene and 5.83 g (0.03 mole) isophthaleic acid dihydrazide are thoroughly mixed in a ball mill and subsequently melted in a round bottom flask at 140° C. The homogeneous clear melt is maintained for 30 minutes at 140° C. The initially fluid mass becomes increasingly viscous. The melt is degassified by the application of a partial vacuum. The resulting imide resin may be further processed as follows:

(a) The melt is poured into casting molds (110×100×3 mm) preheated to 150° C. and is therein subsequently hardened, by raising the temperature in steps within 4 hours to 200° C. and then continued heating for 3 hours at 200° C.

(b) Following the cooling of the melt to room temperature, a 50% solution in N-methylpyrrolidone is prepared under agitation. The solution is stable in relation to viscosity and is suitable for the preparation of preimpregnated glass fiberwebs. Glass fiber webs or fabrics of Type G 92111K 1100 of the Interglas Co. of Ulm, West Germany are homogeneously coated with the resin solution by means of immersion. The impregnated glass fiber web is then dried in a through circulation drying cabinet for 10 minutes at 140° C. The prepregs produced in this manner have a resin content of 38% in a weight per unit area of 320 g/m$^2$ and a residual solvent content of 3–4%. Several glass fabric prepregs are stacked in a heated plate press and the laminate is hardened under pressure at a temperature of 160° C. for one hour and at 200° C. for two hours.

(c) After cooling the melt to room temperature, the prepolymer is homogeneously ground with graphite powder in a ball mill. The resulting mixture is suitable for use as a compression molding material. Moldings may be prepared under pressure at temperatures around 200° C. in a stamping press.

EXAMPLE 2

35.84 g (0.1 mole) 4,4′-bismaleimidodiphenylmethane, 3.46 (0.02 mole) maleimidobenzene and 5.83 g (0.03 mole) terephthalic acid dihydrazide are dissolved in 65.1 g N-methylpyrrolidone with agitation at 90° C. Agitation is continued for 30 minutes at 90° C. to form the prepolymer. The solution of the polyimide prepolymer is run slowly into 1.3 l cold water under agitation, while the polyimide resin precipitates as a fine, yellow powder and is separated by means of filtering.

EXAMPLE 3

43.28 g (0.25 mole) maleimidobenzene, 89.53 g (0.25 mole) 4,4′-bismaleimidodiphenylmethane and 19.42 g (0.1 mole) isophthalic acid dihydrazide are dissolved in 152.29 g dimethylacetamide to a 50% solution with agitation at 50° C. The solution of the polyimide prepolymer has a viscosity of 26.2 centistoke and may be used, as described in Example 1b, to impregnate glass fiber webs. The separation of the prepolymer may be eliminated in this instance. The solution of the prepolymer obtained is extremely stable with respect to viscosity. After storing for 50 days at room temperature, the viscosity amounts to only 31 centistokes.

EXAMPLE 4

5 g maleimidobenzene, 56 g 4,4′-bismaleimidodiphenylmethane, 24 g 2,4-bismaleimidotoluene and 10 g isophthalic acid dihydrazide are mixed homogeneously and in a round bottom flask at 140° C. stirred to a clear melt and degassified. The melt of the polyimide prepolymer may be further processed, as described in Example 1, by molding by way of a solution or as a powder mixture with fillers.

EXAMPLE 5

Similar to Example 4, a mixture of 5 g maleimidobenzene, 5 g maleimidotoluene, 56 g 4,4′-bismalimidodiphenylmethane, 24 g 2,4-bismaleimidotoluene and 10 g isophthalic acid dihydrazide in a round bottom flask under rotation at 125° C. is prepolymerized to homogeneous clear melt. The polyimide prepolymer melt has a viscosity of 260 centistoke and may be used without cooling in the molten state to impregnate glass fabric blanks (15×15 cm). Prepregs produced in this manner contain no solvents and may be pressed at 170°–210° C. to high quality glass fabric laminates.

EXAMPLE 6

For the purpose of preparing glass fabric prepregs to be processed into glass fabric laminates, the prepolymer is prepared in solution and separation is eliminated. 107.51 g (0.3 M) 4,4'-bismaleimidodiphenylmethane, 17.3 g maleimidobenzene (0.1 mole) 10 g isophthalic acid dihydrazide and 7.46 g terephthalic acid dihydrazide are dissolved in 142.3 g dimethyl acetamide by heating to 120° C. with agitation. After 10–15 minutes a bright solution of the prepolymer is obtained. The viscosity of the solution is 52 centistoke. The solution is stable with respect to viscosity and may be stored at room temperature for 3 months, without an appreciable increase in viscosity. The solution of the prepolymer may be used directly to impregnate glass fabrics.

EXAMPLE 7

232 g (0.647 mole) 4,4-bismaleimidophenyl ether, 92.58 g (0.353 mole) 2,4'-bismalemidotoluene, 34.6 g (0.2 mole) maleimidobenzene and 26.4 g (0.2 mole) malonic acid dihydrazide are mixed well in a ball mill and subsequently heated in a round bottom flask with rotation in an oil bath to a temperature of 150° C., until a homogeneous, blank melt is obtained. The melt may be maintained for another few hours at 150° C. to increase its viscosity. After cooling to room temperature, the solidified melt is ground to a fine powder. This prepolymer may be mixed with other fillers in the powder form (quartz flour, graphite powder, molybdenum sulfide). The molding mass obtained in this manner may be molded into shapes of high thermal stability.

What is claimed is:

1. A thermosetting imide resin comprising the reaction product of
(a) a mixture of an N,N'-bisimide of an unsaturated dicarboxylic acid of the general formula of

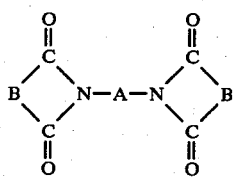

and a monoimide of the general formula (II)

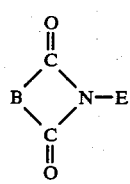

wherein the residue A signifies a divalent organic group with at least two carbon atoms, E is selected from the group consisting of alkyl, cycloalkyl, and aryl groups and B a divalent organic group of the formulas indicated hereinbelow

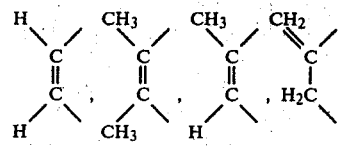

with
(b) the dihydrazide of an organic dicarboxylic acid of the general formula (III)

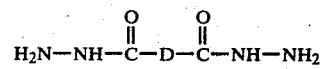

wherein D represents a divalent organic group, the molar proportion of the reaction between the unsaturated imide groups contained in the mixture and the hydrazide groups contained in the mixture $$\frac{\text{Number of moles of unsaturated imide}}{\text{Number of moles of acid hydrazide}}$$

being between 1.1 and 100.

2. The imide resin of claim 1 wherein the bisimide is a bisimide selected from the group consisting of
1,2-bismaleimido ethane,
1,4-bismaleimido butane,
1,6-bismaleimido hexane,
1,12-bismaleimido dodecane,
1,6-bismaleimido-(2,2,4-trimethyl)hexane,
1,3-bismaleimido benzene,
1,4-bismaleimido benzene,
4,4'-bismaleimido diphenyl methane,
4,4'-bismaleimido diphenyl ether,
4,4'-bismaleimido diphenyl sulfide,
4,4'-bismaleimido diphenyl sulfone,
4,4'-bismaleimido dicyclohexyl methane,
2,4-bismaleimido toluene,
2,6-bismaleimido toluene,
N,N'-m-xylylene bismaleimide,
N,N'-p-xylylene bismaleimide,
N,N'-m-phenylene biscitraconic acid imide,
N,N'-4,4'-diphenylmethane citraconimide, and
N,N-4,4'-diphenylmethane bisitaconimide.

3. The imide resin of claim 1 wherein the monoimide is a monoimide selected from the group consisting of
N-methylmaleimide,
N-ethylmaleimide,
N-propylmaleimide,
N-dodecylmaleimide,
N-isobutylmaleimide,
N-isopropylmaleimide,
N-phenylmaleimide,
N-phenylcitroconimide,
N-phenylitaconimide,
N-toluylmaleimide,
N-mono-chlorophenylmaleimide,
N-biphenylmaleimide,
N-naphthylmaleimide,
N-vinylmaleimide,
N-allylmaleimide, and
N-cyclohexylmaleimide.

4. The imide resin of claim 1 wherein the dicarboxylic acid dihydrazide is a dihydrazide selected from the group consisting of:
oxalic acid dihydrazide,
malonic acid dihydrazide,
succinic acid dihydrazide,
glutaric acid dihydrazide,
adipic acid dihydrazide,
pimelic acid dihydrazide,
suberic acid dihydrazide,
sebacic acid dihydrazide,
cyclohexane dicarboxylic acid dehydrazide,
terephthalic acid dihydrazide,
isophthalic acid dihydrazide,
2,6-naphthalene dicarboxylic acid dihydrazide,
2,7-naphthalene dicarboxylic acid dihydrazide and mixtures of said dihydrazides.

5. The imide resin of claim 1, said resin being prepared by using a mixture of bisimides as the bisimide reactant.

6. The imide resin of claim 1, said resin being prepared by using a mixture of monoimides as the monoimide reactant.

7. The imide resin of claim 1, said resin being prepared by using a mixture of dicarboxylic acid dihydrazide as the dihydrazide reactant.

8. The imide resin of claim 1, said resin being prepared by reacting 4,4'-bismaleimido diphenylmethane, maleimidobenzene and isophthalic acid dihydrazide.

9. The imide resin of claim 1 containing an organic peroxide as curing catalyst.

10. The imide resin of claim 1 containing a curing inhibitor.

11. In a process of producing a thermosetting imide resin, the step which comprises heating
(a) a mixture of an N,N'-bisimide of an unsaturated dicarboxylic acid of the general formula of

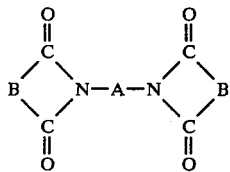 (I)

and a monoimide of the general formula (II)

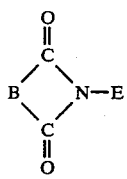 II wherein the residue A signifies a divalent organic group with at least two carbon atoms, E is selected from the group consisting of alkyl, cycloalkyl, and aryl groups and B a divalent organic group of the formulas indicated hereinbelow

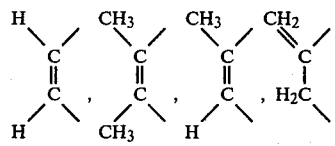

with
(b) the dihydrazide of an organic dicarboxylic acid of the general formula (III)

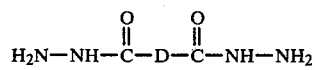

wherein D represents a divalent organic group, the molar proportion of the reaction between the unsaturated imide groups contained in the mixture and the hydrazide groups contained in the mixture $$\frac{\text{Number of moles of unsaturated imide}}{\text{Number of moles of acid hydrazide}}$$

being between 1.1 and 100 in a molar proportion of imide groups to dihydrazide group between about 1.1 and about 100 in an organic diluent to a temperature not substantially exceeding about 180° C. for a period of time to yield a moldable and curable, thermosetting prepolymerized imide resin.

12. The process of claim 11, in which the diluent is an inert, polar organic solvent.

13. The process of claim 12, in which the inert, polar organic solvent is a solvent selected from the group consisting of dimethylformamide, dimethylacetamide, N-methylpyrrolidone, and tetramethyl urea.

14. The process of claim 11, comprising the additional step of hardening and curing the prepolymerized imide resin by further heating the same to a temperature between about 100° C. and about 350° C. to yield a substantially insoluble, infusible, cross-linked polymerized imide resin of high thermal stability.

15. The process of claim 14, in which the additional step is carried out with the addition of a curing accelerating catalyst.

16. The process of claim 11, in which the step of producing the prepolymerized imide resin is carried out with the addition of a curing inhibiting agent.

17. The solution of moldable and curable, thermosetting, prepolymerized imide resin of claim 1 in an inert, polar, organic solvent, said solution being stable on storage for a prolonged period of time without its viscosity substantially increasing during said storage.

* * * * *